(12) United States Patent
Lavoie et al.

(10) Patent No.: US 10,489,662 B2
(45) Date of Patent: Nov. 26, 2019

(54) VEHICLE BOUNDARY DETECTION

(71) Applicant: Ford Global Technologies, LLC, Dearborn, MI (US)

(72) Inventors: Erick Michael Lavoie, Dearborn, MI (US); Zheng Hu, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 15/221,507

(22) Filed: Jul. 27, 2016

(65) Prior Publication Data

US 2018/0032821 A1 Feb. 1, 2018

(51) Int. Cl.

| | |
|---|---|
| *H04N 7/18* | (2006.01) |
| *G06K 9/00* | (2006.01) |
| *B60R 1/00* | (2006.01) |
| *G06K 9/46* | (2006.01) |
| *G06K 9/52* | (2006.01) |
| *G06K 9/62* | (2006.01) |
| *G06T 7/60* | (2017.01) |
| *H04N 5/265* | (2006.01) |
| *G06T 7/11* | (2017.01) |
| *G06T 7/136* | (2017.01) |
| *G06T 7/13* | (2017.01) |

(52) U.S. Cl.
CPC .......... *G06K 9/00791* (2013.01); *B60R 1/00* (2013.01); *G06K 9/4604* (2013.01); *G06K 9/52* (2013.01); *G06K 9/6202* (2013.01); *G06T 7/11* (2017.01); *G06T 7/13* (2017.01); *G06T 7/136* (2017.01); *G06T 7/60* (2013.01); *H04N 5/265* (2013.01); *G06T 2207/30252* (2013.01)

(58) Field of Classification Search
CPC ............ B60R 1/00; B60R 2300/105; B60R 2300/806; B60R 2300/607
USPC ......................................................... 348/148
See application file for complete search history.

(56) References Cited

U.S. PATENT DOCUMENTS

| | | | |
|---|---|---|---|
| 7,301,479 B2 | 11/2007 | Regan | |
| 8,180,547 B2 | 5/2012 | Prasad et al. | |
| 8,493,236 B2 | 7/2013 | Boehme et al. | |
| 8,618,955 B2 | 12/2013 | Baker | |
| 2008/0226189 A1* | 9/2008 | Connell | G06T 5/50 382/255 |

(Continued)

FOREIGN PATENT DOCUMENTS

| | | | | |
|---|---|---|---|---|
| DE | 102012222443 A1 | 6/2014 | | |
| GB | 2530649 A | * | 3/2016 | .............. B60R 1/00 |

OTHER PUBLICATIONS

Unpublished pending U.S. Appl. No. 14/991,496, filed Jan. 8, 2016 which is not being furnished herewith, pursuant to the Commissioner's Notice dated Sep. 21, 2004.

(Continued)

*Primary Examiner* — Masum Billah
(74) *Attorney, Agent, or Firm* — Frank Lollo; Eversheds Sutherland (US) LLP

(57) ABSTRACT

A vehicle includes a camera and processor(s) configured to: record images via the camera; combine the recorded images; identify edges in the combined image by comparing each pixel of the combined image to a threshold; update dimensions of the vehicle based on the identified edges; execute an automatic parking routine based on the updated dimensions.

24 Claims, 7 Drawing Sheets

(56) References Cited

U.S. PATENT DOCUMENTS

| | | | |
|---|---|---|---|
| 2012/0265416 A1* | 10/2012 | Lu | B60R 1/00 |
| | | | 701/70 |
| 2012/0268602 A1* | 10/2012 | Hirai | G06K 9/00798 |
| | | | 348/148 |
| 2014/0085472 A1 | 3/2014 | Lu et al. | |
| 2014/0160276 A1* | 6/2014 | Pliefke | B60R 1/00 |
| | | | 348/118 |
| 2014/0200759 A1* | 7/2014 | Lu | B60D 1/245 |
| | | | 701/28 |
| 2015/0149040 A1 | 5/2015 | Hueger et al. | |
| 2016/0009509 A1 | 1/2016 | Bonefas et al. | |
| 2016/0107583 A1 | 4/2016 | Krishnan et al. | |
| 2016/0119539 A1 | 4/2016 | Tan | |
| 2016/0267660 A1* | 9/2016 | Vivet | G06T 5/002 |
| 2017/0180659 A1* | 6/2017 | Levoy | H04N 5/2178 |

OTHER PUBLICATIONS

Unpublished pending U.S. Appl. No. 15/186,850 which is not being furnished herewith, pursuant to the Commissioner's Notice dated Sep. 21, 2004.

Unpublished pending U.S. Appl. No. 14/972,761 which is not being furnished herewith, pursuant to the Commissioner's Notice dated Sep. 21, 2004.

Search Report dated Jan. 26, 2018, for GB Patent Application No. 1712063.5 (4 pages).

\* cited by examiner

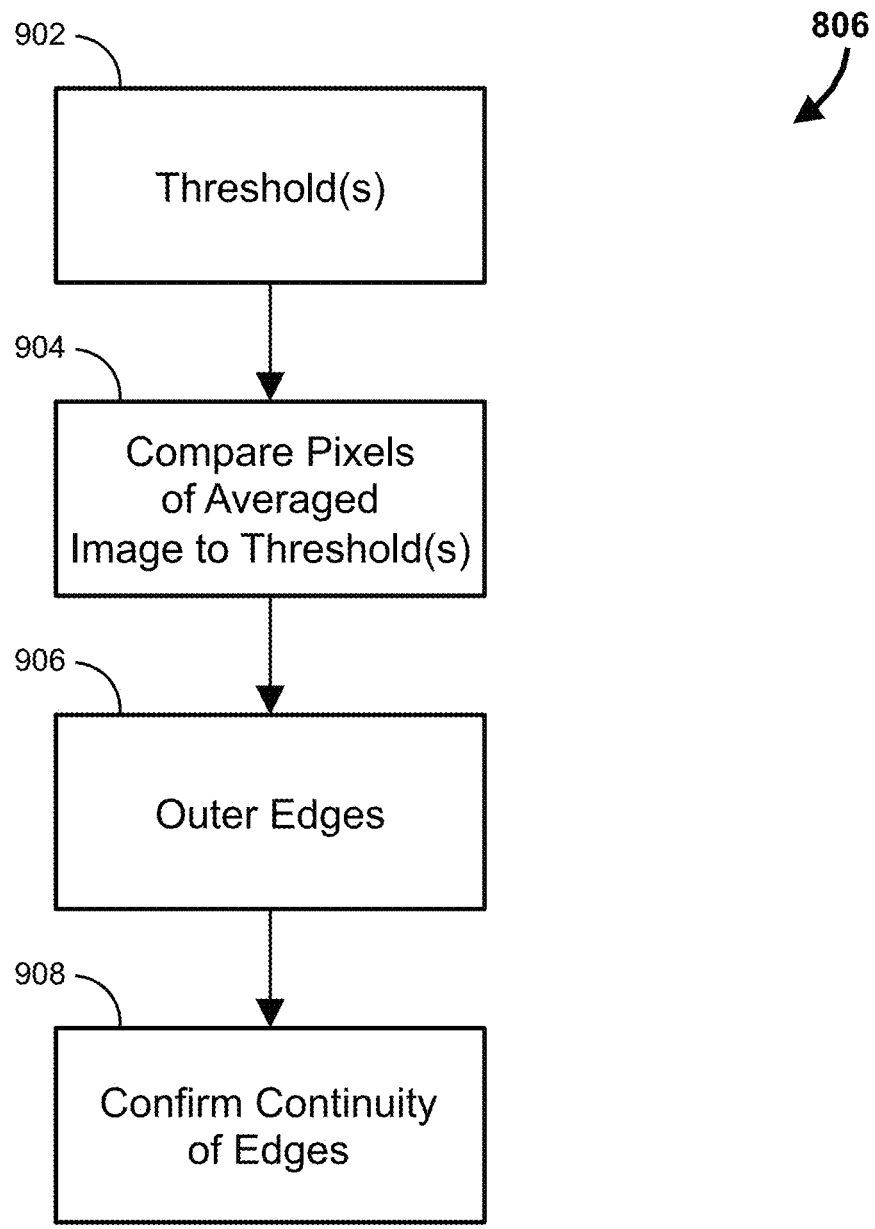

VEHICLE BOUNDARY DETECTION

TECHNICAL FIELD

This disclosure relates to automated detection of vehicle dimensions.

BACKGROUND

Existing vehicles include autonomous driving technologies (e.g., automatic parking programs or automatic steering programs) that depend on accurate vehicle dimensions. For example, autonomous parking programs rely on length and width of the vehicle when determining whether a potential spot can accommodate the vehicle. One solution is to preprogram vehicle dimensions at the time of manufacturing. Customers, however, may affix objects to the vehicles (e.g., bicycle racks) that alter the dimensions and render the programmed dimensions inaccurate. A new solution is needed to accurately and automatically determine updated dimensions of vehicles.

SUMMARY

A vehicle consistent with the present disclosure includes a camera and processor(s) configured to: record images via the camera; combine the recorded images; identify edges in the combined image by comparing each pixel of the combined image to a threshold; update dimensions of the vehicle based on the identified edges; execute an automatic parking routine based on the updated dimensions.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 9 is a block diagram showing details of a block of the method of FIG. 8.

DETAILED DESCRIPTION OF EXAMPLE EMBODIMENTS

Figure 1:
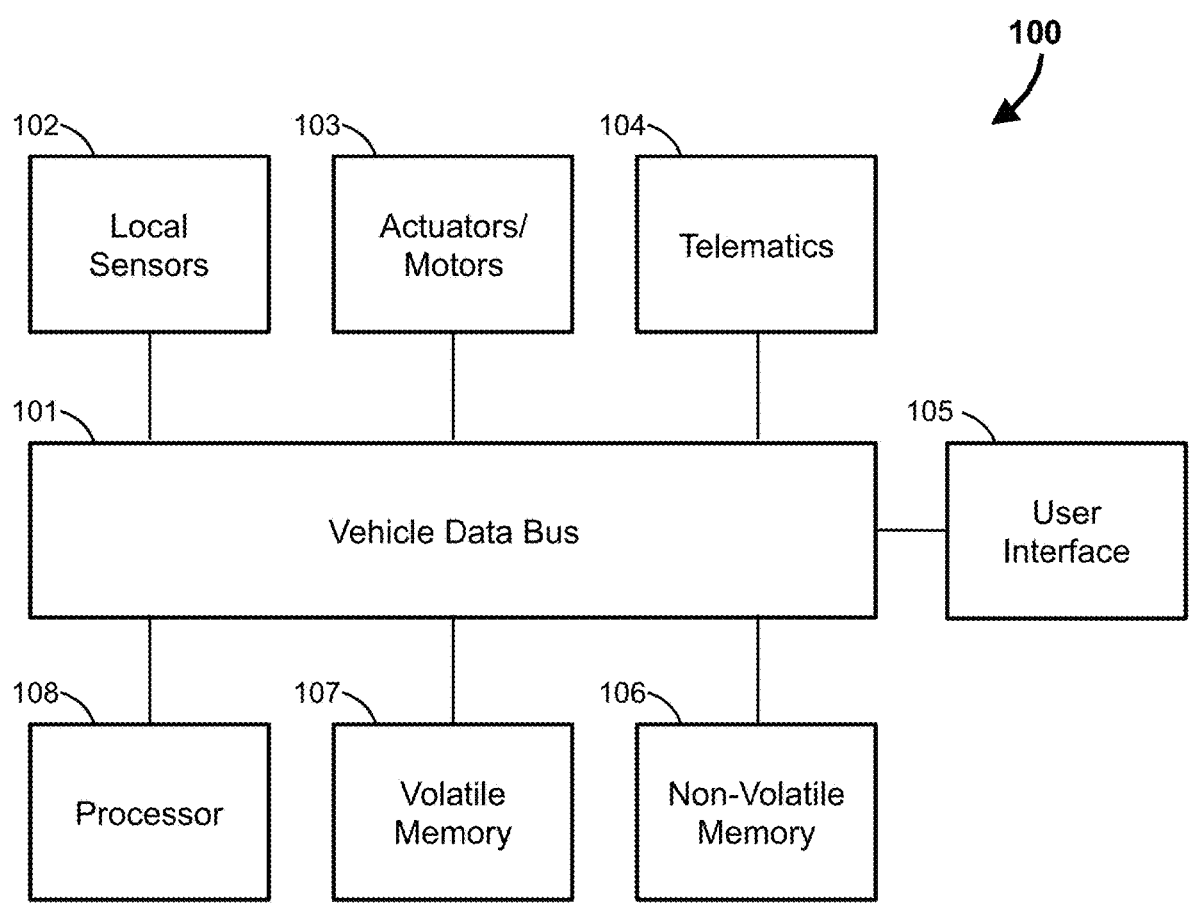
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of an example vehicle 200. The vehicle 200 is also referred to as a first vehicle 200. The vehicle 200 includes a motor, a battery, at least one wheel driven by the motor, and a steering system configured to turn the at least one wheel about an axis. Suitable vehicles are also described, for example, in U.S. patent application Ser. No. 14/991,496 to Miller et al. ("Miller"), U.S. Pat. No. 8,180,547 to Prasad et al. ("Prasad"), U.S. patent application Ser. No. 15/186,850 to Lavoie et. al. ("Lavoie") and U.S. patent application Ser. No. 14/972,761 to Hu et al. ("Hu"), all of which are hereby incorporated by reference in their entireties. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The telematics unit 104 may be configured to broadcast signals at a certain frequency.

The actuators/motors 103 produce physical results. Examples of actuators/motors include fuel injectors, windshield wipers, brake light circuits, transmissions, airbags, engines, power train motors, steering, etc. The local sensors 102 transmit digital readings or measurements to the processor 108. Examples of suitable sensors include temperature sensors, rotation sensors, seatbelt sensors, speed sensors, cameras, lidar sensors, radar sensors, etc. It should be appreciated that the various connected components of FIG. 1 may include separate or dedicated processors and memory. Further detail of the structure and operations of the computing system 100 is described, for example, in Miller and/or Prasad.

Figure 2:
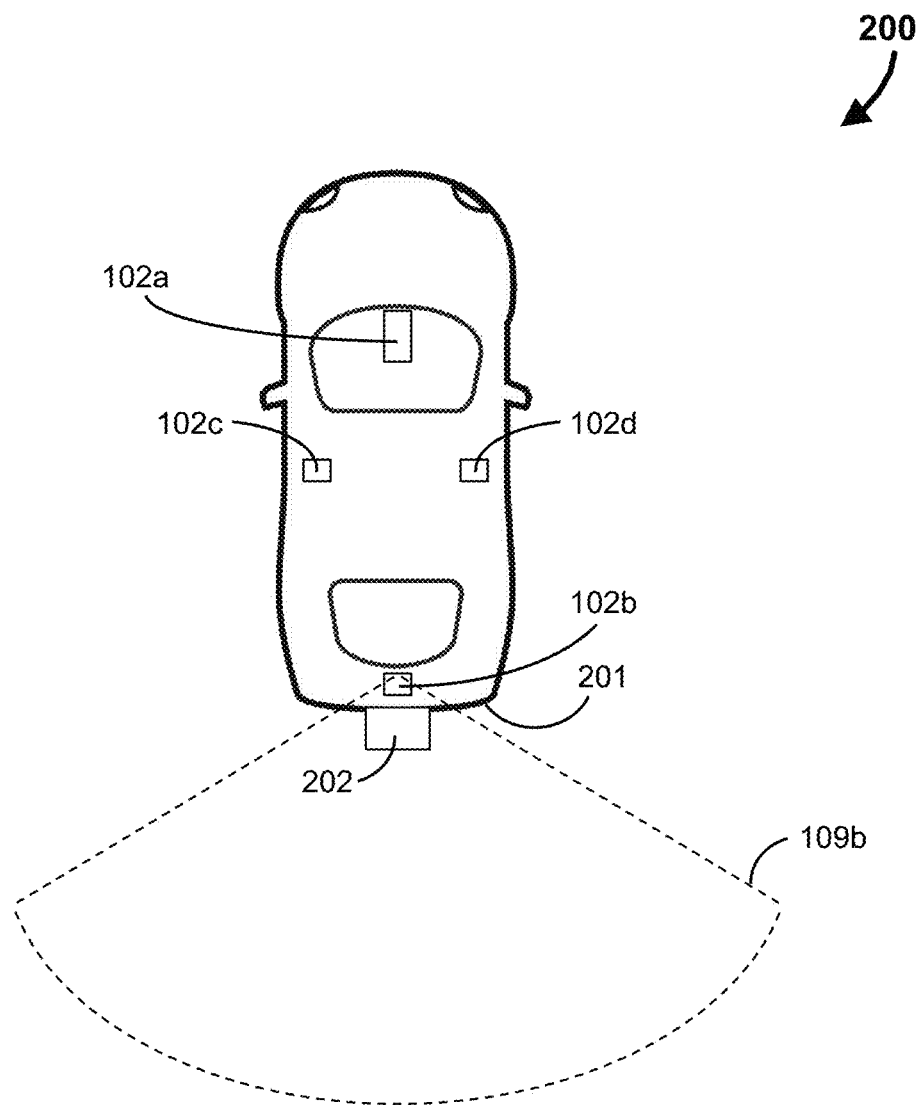
FIG. 2 is a schematic of a vehicle including the vehicle computing system.

FIG. 2 generally shows and illustrates the vehicle 200, which includes the computing system 100. Although not shown, the vehicle 200 is in operative wireless communication with a nomadic device, such as a mobile phone. Some of the local sensors 102 are mounted on the exterior of the vehicle 200. Local sensor 102a may be an ultrasonic sensor, a lidar sensor, a camera, a video camera, and/or a microphone, etc. Local sensor 102a may be configured to detect objects leading the vehicle 200. Local sensor 102b may be an ultrasonic sensor, a lidar sensor, a camera, a video camera, and/or a microphone, etc. Local sensor 102b may be configured to detect objects trailing the vehicle 200 as indicated by trailing sensing range 109b. Left sensor 102c and right sensor 102d may be configured to perform the same functions for the left and right sides of the vehicle 200. The vehicle 200 includes a host of other sensors 102 located in the vehicle interior or on the vehicle exterior. These sensors may include any or all of the sensors disclosed in Prasad.

It should be appreciated that the vehicle 200 is configured to perform the methods and operations described below. In some cases, the vehicle 200 is configured to perform these functions via computer programs stored on the volatile and/or non-volatile memories of the computing system 100. A processor is "configured to" perform a disclosed operation when the processor is in operative communication with memory storing a software program with code or instructions embodying the disclosed operation. Further description of how the processor, memories, and programs cooperate appears in Prasad. It should be appreciated that the nomadic device or an external server in operative communication with the vehicle 200 perform some or all of the methods and operations discussed below.

According to various embodiments, the vehicle 200 includes some or all of the features of the vehicle 100a of Prasad. According to various embodiments, the computing system 100 includes some or all of the features of the VCCS 102 of FIG. 2 of Prasad. According to various embodiments, the vehicle 200 is in communication with some or all of the devices shown in FIG. 1 of Prasad, including the nomadic device 110, the communication tower 116, the telecom network 118, the Internet 120, and the data processing center 122. According to various embodiments, the vehicle 200 is the vehicle 14 of Hu and the computing system 100 includes some or all of the features of the trailer backup assist system 10 shown in FIG. 2 of Hu.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Figure 3:
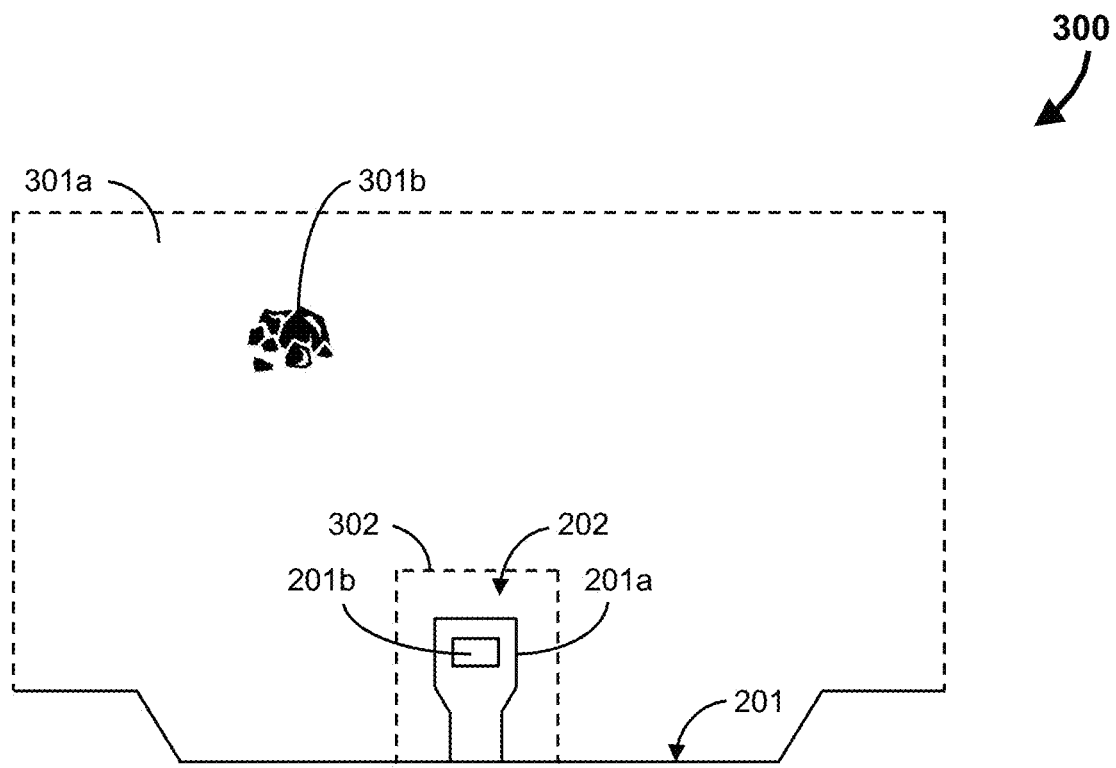
FIG. 3 is a schematic of an image recorded by a local sensor.

FIG. 3 is an image 300, taken by the rear camera 102b, of the vehicle rear 201 with the trailer hitch 202. The image 300 is a view of the trailing sensing range 109b. The trailer hitch 202 has an outer boundary 201a and an inner boundary 201b. The inner boundary 201b constitutes the outer edges of a feature, such as an aperture extending through the trailer hitch 202 or a post vertically extending above the trailer hitch 202. The image 300 includes ground 301a (e.g., pavement or grass) and external objects 301b (e.g., trash, animals). The ground 301a and the external objects 301b do not contribute to the dimensions of the vehicle 200 and are thus referred to as noise.

It should be appreciated that the trailer hitch 202 is only an example of an object affixed to the vehicle 200. The present invention may be applied to any other object (e.g., a bicycle rack) affixed to the vehicle end 201. It should be appreciated that the methods disclosed herein may be applied to any side or portion of the vehicle (e.g., the side doors or the grill). It should further be appreciated that the methods disclosed herein may be applied outside of the vehicle context (e.g., to find dimensions of buildings).

As described above, a range of software programs, such as autonomous driving programs and autonomous parking programs, depend on accurate dimensions (e.g., length, width, height) of the vehicle 200. When customers secure objects to the vehicle (e.g., the trailer hitch 202, a bicycle rack), factory preloaded dimensions of the vehicle are no longer accurate (e.g., the actual length of the vehicle for the purposes of the technologies should be the original length of the vehicle plus the length of the affixed object). The present invention is configured to determine dimensions of objects secured to the vehicle 200 (e.g., the trailer hitch 202 or the bicycle rack), and then update or extend the factory preloaded dimensions accordingly. The software programs rely on the updated or extended dimensions as opposed to the factory preloaded dimensions.

Figure 8:
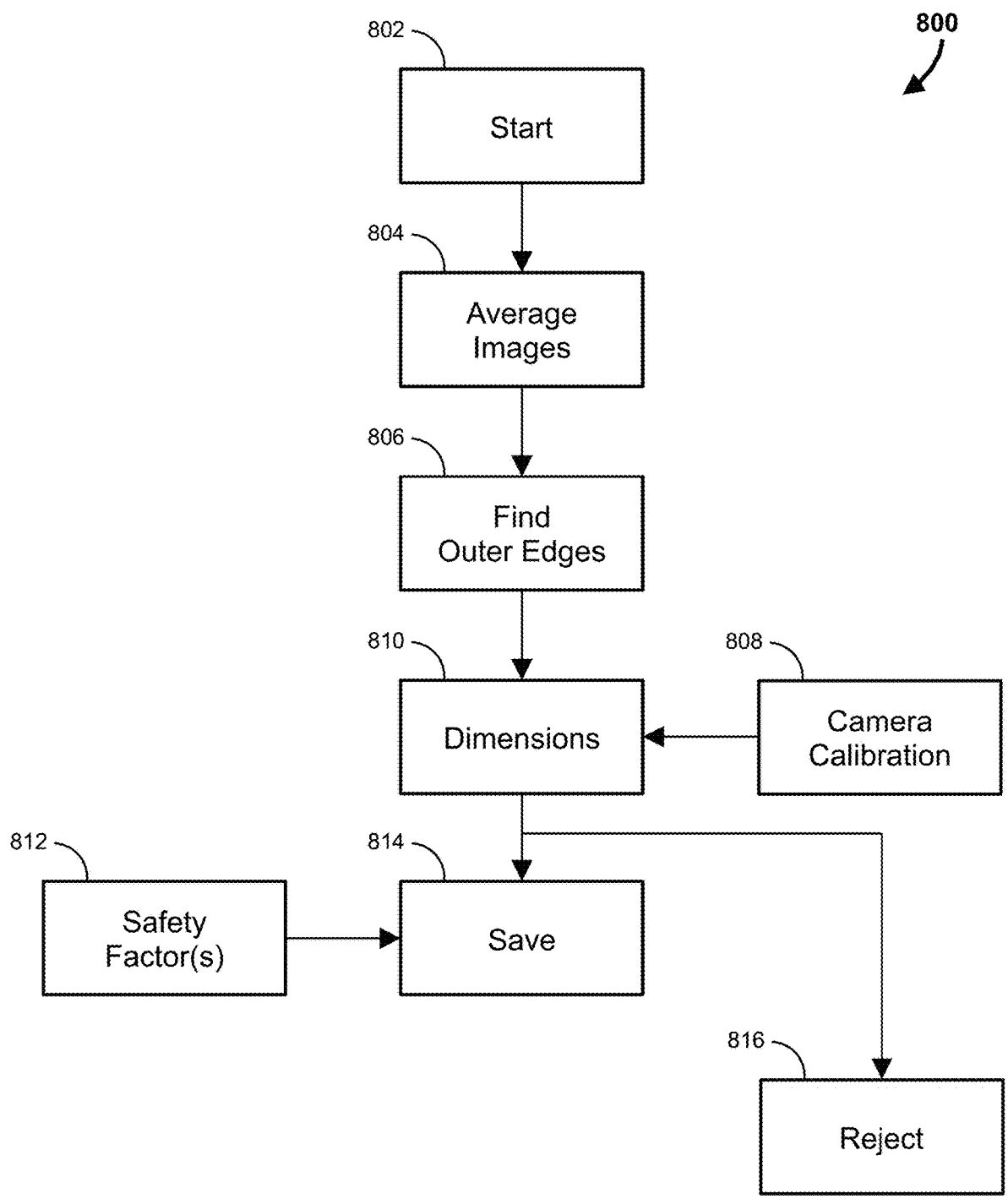
FIG. 8 is a block diagram of a method.

FIG. 8 is a block diagram of a method 800 of updating vehicle dimensions to account for affixed objects. The vehicle 200 (via suitable programming stored on the memory and executable by the processor) is configured to perform the method 800. The method 800 generally involves deriving the dimensions of objects affixed to the vehicle 200 via images or photographs recorded by one of the local sensors 102.

At block 802 the method 800 starts. The method 800 may start in response to a range of various commands or detected states. According to various embodiments, the method 800 starts at block 802 in response to (a) the vehicle detecting a shift from park gear to drive gear or reverse gear, (b) the vehicle attaining a certain speed, (c) a command from a related program (e.g., the autonomous driving program), and/or (d) a vehicle start (i.e., a new key cycle).

At block 804, one of the local sensors 102 captures a series of images of the vehicle. For example, the back local sensor 102b may capture a series of still images 300 of the end of the vehicle 201. As previously described, the images 300 include portions of the vehicle 200, objects affixed to the vehicle 200 (e.g., the trailer hitch 202), noise 301, 302 (e.g., ground trash, animals, etc.).

For each cycle of the method 800, the number of captured images may be predetermined. The time elapsed in-between capturing images may be predetermined. The predetermined number of captured images may, as described below, depend on pixel or intensity values of an averaged or combined image. For example, the vehicle 200 may continue capturing images 300 until an average pixel value of an identified portion (e.g., the upper left side) of the captured images reaches a predetermined value or a predetermined range of values. Alternatively or in addition, vehicle 200 may continue capturing images until at least a predetermined number of pixels of the averaged or combined image observe some predetermined relationship (e.g., half of the pixels are within 15 pixel or intensity values of each other).

As described above, at block 804, the vehicle 200 averages or combines the captured images 300 into an averaged or combined image. According to various embodiments, the vehicle 200 only averages captured images 300 satisfying predetermined criteria (e.g., taken within the last X number of seconds, taken within the current key cycle, taken within the current cycle of the method 800 (the method 800 repeats)).

In general, the averaging process includes averaging the pixels of the series of captured images 300 after optionally stabilizing the images (i.e., aligning them to account for slight vibrations by the local sensor 102). For example, in some images 300, each pixel is associated with a pixel or intensity value ranging from 0 to 255. The vehicle 200 selects a pixel location (e.g., the top left pixel). The vehicle 200 adds the pixel or intensity values of the top left pixel of each of the taken images. The vehicle 200 divides the added value by the number of taken images. The vehicle 200 repeats this process for each pixel location.

At block 806, the vehicle 200 finds outer edges of objects within the averaged or combined image. The outer edges will show outer edges of the vehicle 200 (e.g., the vehicle rear 201) and objects affixed to the vehicle (e.g., the trailer hitch 202). The vehicle 200 finds the outer edges by analyzing the averaged or combined image. The analyzing process is described in greater detail below with reference to FIG. 9. In general, the analyzing process involves determining an interface between items statically affixed to the vehicle 200 and blurred background noise.

At block 808, the vehicle 200 references calibration data related to the local sensor 102 (e.g., local sensor 102b) that recorded the images. The calibration data may include a position and angle of the local sensor 102. The calibration data, as described below, enables the vehicle 200 to associate specific pixels on the averaged image with a real-world spatial position. Thus, the calibration data enables the vehicle 200 to determine dimensions of objects defined by specific pixels.

At block 810, the vehicle 200 determines dimensions of the vehicle 200 (e.g., the vehicle rear 201) and any objects affixed to the vehicle (e.g., the trailer hitch 202) based on the identified outer edges of the averaged image as determined at block 806 and the calibration data loaded at block 808. If the dimensions satisfy predetermined criteria then the vehicle 200 proceeds to blocks 812 and 814.

The predetermined criteria may be the newly determined dimensions falling within a predetermined area. FIG. 3 shows an example predetermined area 302. If any of the dimensions fall outside of the predetermined area 302, then the vehicle 200 may automatically reject the dimensions at block 816. The area 302 may be preset and, as shown in FIG. 3, extend at a predetermined length and width. It should be appreciated that this process may be performed before finding the dimensions by confirming that the outer edges of the averaged or combined image fall within a predetermined pixel area (the predetermined area 302 could correspond to the predetermined pixel area such that if outer edges of the averaged or combined image fall outside of the predetermined pixel area, then the outer edges do not satisfy the predetermined criteria).

If, at block 810, the dimensions (or the outer edges, as discussed above) satisfy the predetermined criteria, then the vehicle 200 enhances the dimensions with a safety factor at block 812. The safety factor may be a multiplier (e.g., 1.3) applied to the dimensions (e.g., if the length of the affixed object was 10 cm, the enhanced length of the affixed object would be 13 cm). Block 812 is optional. The vehicle 200 saves the enhanced dimensions at block 814 for use by the other technologies discussed above. For example, the autonomous parking program may apply the enhanced dimensions when determining whether an unoccupied space is suitable as a parking spot or when determining parking maneuvers to enter an open parking spot.

If the dimensions (or the outer edges, as described above) fail to satisfy the predetermined criteria, then the vehicle 200 rejects the dimensions at block 816 and returns to block 802. If the vehicle 200 is unable to find dimensions (or outer edges) satisfying the predetermined criteria after a predetermined number of cycles of the method 800 (which may be a single cycle), then the vehicle 200 marks the dimensions as unknown. An unknown mark may cause other programs (e.g., autonomous parking programs) that rely on the vehicle dimensions to display an error message or disable. When the vehicle 200 marks dimensions as unknown, the vehicle 200 may automatically present a screen on the user interface 105 enabling the customer to manually input dimensions. The vehicle 200 saves the manually input dimensions as the enhanced dimensions.

FIG. 9 generally shows and illustrates details of block 806. As described above, block 806 enables the vehicle 200 to find outer edges of objects or structures appearing in the averaged or combined images. At block 902, the vehicle 200 loads or determines one or more thresholds. The thresholds may be predetermined. The thresholds may be based on features of the averaged or combined image (e.g., an average of a certain portion of predetermined pixels). At block 904, the vehicle 200 compares each pixel of the averaged or combined image to one of the thresholds. If a compared pixel exceeds the threshold by at least a predetermined degree (e.g., one pixel or intensity value) the vehicle 200 marks the pixel as active. Otherwise, the vehicle 200 marks the pixel as inactive. Block 904 continues until the vehicle 200 determines the active/inactive status of each pixel of the averaged or combined image.

At block 906, the vehicle 200 finds outer edges of objects within the averaged or combined image. More specifically, the vehicle 200 sets the outer edges as equal to the outermost active pixels such that every active pixel is either on one of the outer edges or lies within the outer edges. At block 908, the vehicle 200 confirms that the outer edges are continuous (i.e., form a complete boundary). If the outer edges are discontinuous (e.g., include breaks), then the vehicle 200 proceeds to block 816 of FIG. 8. If the edges are continuous (e.g., do not include breaks), the vehicle 200 proceeds to blocks 808 and 810.

Figure 4:
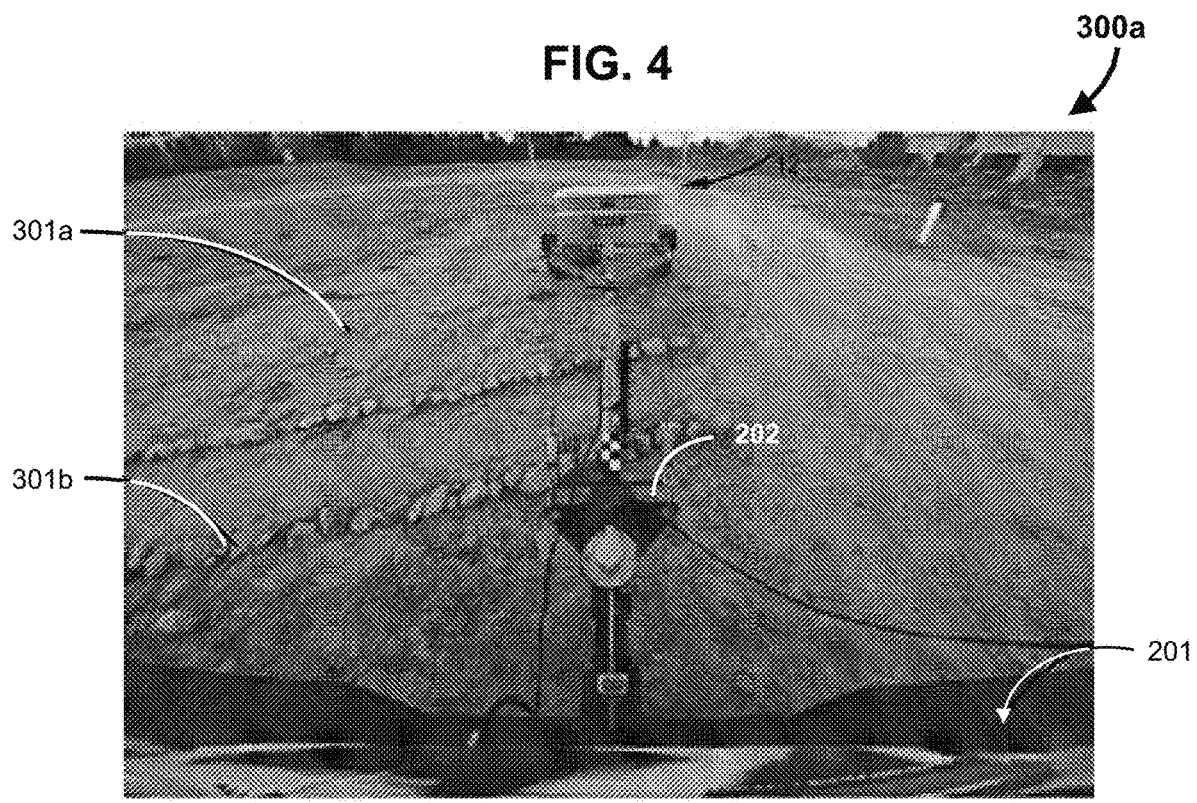
FIG. 4 is an example image recorded by the local sensor.
Figure 5:
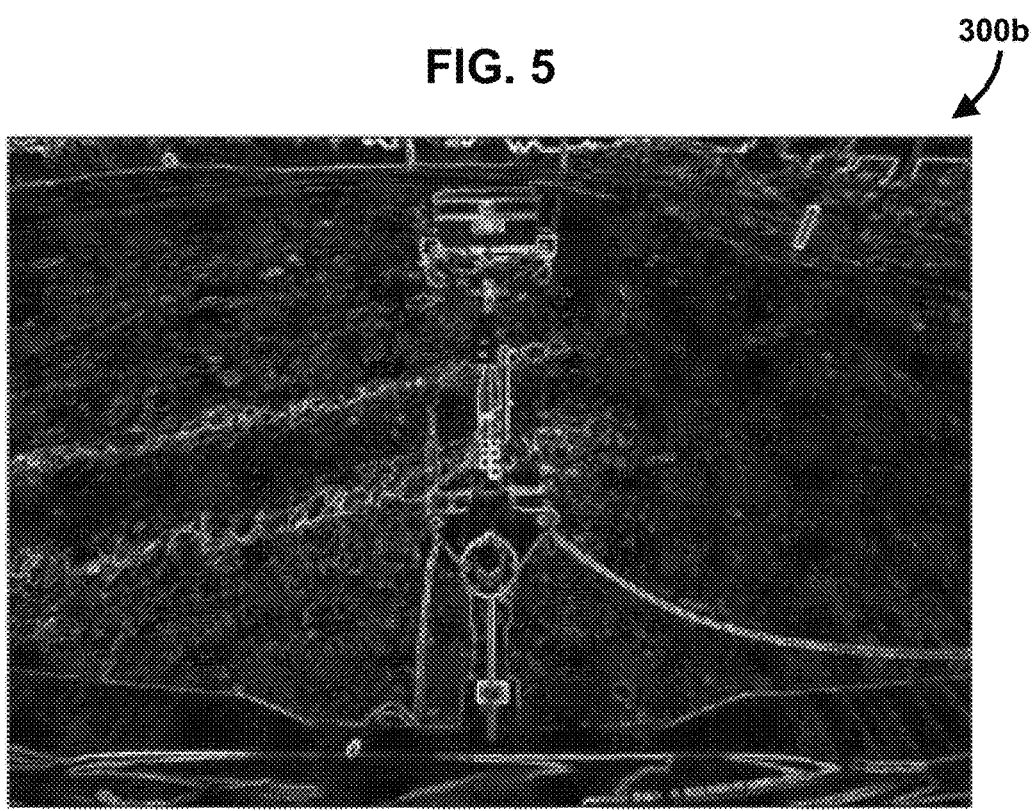
FIG. 5 is an analysis of the image of FIG. 4.

FIG. 4 is an image 300a taken by the rear local sensor 102b. The image 300a shows ground 301a, external objects 301b (in this case, stones), the vehicle rear 201, and the trailer hitch 202. FIG. 5 shows an analysis 400a of the image 300a. The analysis 400a has incorporated the steps of block 806, but not the steps of block 804. The white pixels represent active pixels. The dark pixels represent inactive pixels. Note that portions of the ground 301a and the external objects 301b have been incorrectly marked as active. The outer edges will thus be incorrect.

Figure 6:
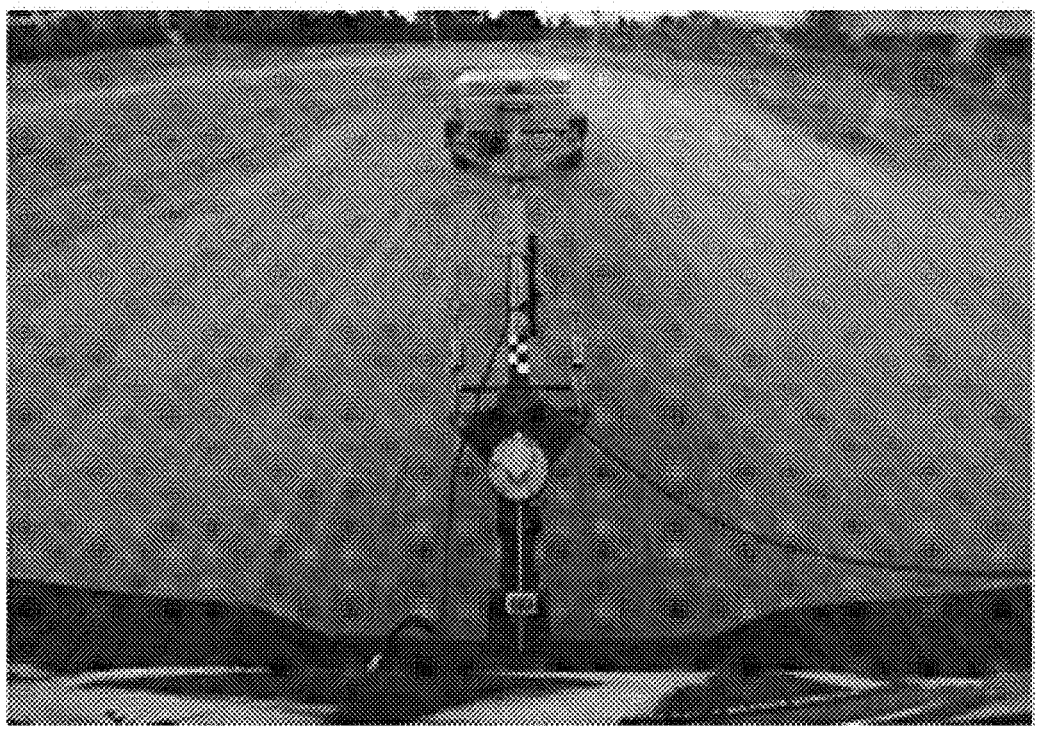
FIG. 6 is an example combined image.
Figure 7:
FIG. 7 is an analysis of the combined image of FIG. 6.

FIG. 6 is an averaged or combined image 600a. FIG. 6 illustrates an outcome of block 804. Note that the ground 301a and the external objects 301b have blurred together as a result of the averaging or combining, while the end of the vehicle 201 and the trailer hitch 202 remain distinct. FIG. 7 shows an analysis 600b of the image 600a. Here, the analysis 600b incorporates both blocks 804 and 806. Note that the edges of the vehicle 200 and the trailer hitch 202 have now been correctly marked as compared with the analysis 300b of FIG. 5. Some of the pixels at the top of the analysis 600b have been incorrectly marked as active due to insufficient blurring. Thus additional images must be incorporated into the averaged or combined image 600a to generate continuous outer edges.

It should be appreciated that the vehicle 200 may include multiple local sensors 102 pointed at the same general location (e.g., the rear of the vehicle 200). Thus, the vehicle 200 may perform the method 800 for each of the local sensors, and then compare dimensions associated with each of the local sensors 102. If the dimensions are inconsistent, then the vehicle 200 may reject the results of each local sensor 102 and mark the dimensions as unknown.

The invention claimed is:

1. A vehicle comprising:
a camera; and
processor(s) configured to:
record a plurality of images over time via the camera;
generate a combined image by averaging pixels of each of the plurality of images with pixels of each other ones of the plurality of images at corresponding pixel locations;
identify edges in the combined image;
determine dimensions of the vehicle and any objects connected thereto based on the identified edges;
identify outermost edges in the combined image; and
determine the dimensions of the vehicle and any objects connected thereto based on the identified outermost edges only if the identified outermost edges are located within a predetermined pixel area of the combined image, the predetermined pixel area including only a portion of the pixels of the combined image.

2. The vehicle of claim 1, wherein the processor(s) are configured to: prior to generating the combined image, discard, from the plurality of images, all images failing to meet a predetermined criteria.

3. The vehicle of claim 2, wherein the predetermined criteria is a current key cycle such that the processor(s) are configured to only include images recorded with the current key cycle in the plurality of images.

4. The vehicle of claim 1, wherein the processor(s) are configured to: align the plurality of images prior to generating the combined image.

5. The vehicle of claim 1, wherein the processor(s) are configured to: identify the edges in the combined image by comparing each pixel of the combined image to a pixel threshold.

6. The vehicle of claim 5, wherein the processor(s) are configured to: calculate the pixel threshold based on detected features of the combined image.

7. The vehicle of claim 6, wherein the processor(s) are configured to: confirm continuity of the identified edges prior to updating the dimensions of the vehicle and any objects connected thereto.

8. The vehicle of claim 1, wherein the processor(s) are configured to: execute an automatic parking routine based on the determined dimensions.

9. The vehicle of claim 1, comprising a plurality of cameras pointed at a rear of the vehicle and wherein the processor(s) are configured to: generate a combined image for each camera; associate dimensions of the vehicle and any objects connected thereto with each combined image; determine whether the associated dimensions are inconsistent.

10. A method of finding dimensions of a vehicle and any objects connected thereto, via processor(s) of the vehicle comprising a camera, the method comprising:
recording a plurality of images over time via the camera;
generating a combined image by averaging pixels of each of the plurality of images with pixels of each other ones of the plurality of images at corresponding pixel locations;
identifying edges in the combined image;
determining the dimensions of the vehicle and any objects connected thereto based on the identified edges;
identifying outermost edges in the combined image; and
determining the dimensions of the vehicle and any objects connected thereto based on the identified outermost edges only if the identified outermost edges are located within a predetermined pixel area of the combined image, the predetermined pixel area including only a portion of the pixels of the combined image.

11. The method of claim 10, comprising: prior to generating the combined image, discarding, from the plurality of images, all images failing to meet predetermined criteria.

12. The method of claim 11, wherein the predetermined criteria is a current key cycle such that the method only incorporates images recorded with the current key cycle in the plurality of images.

13. The method of claim 10, comprising: aligning the plurality of images prior to generating the combined image.

14. The method of claim 10, comprising: identifying the edges in the combined image by comparing each pixel of the combined image to a pixel threshold.

15. The method of claim 14, comprising: calculating the pixel threshold based on detected features of the combined image.

16. The method of claim 15, comprising: confirming continuity of the identified edges prior to determining the dimensions of the vehicle and any objects connected thereto.

17. The method of claim 10, comprising: executing an automatic parking routine based on the determined dimensions.

18. The method of claim 10, wherein the vehicle comprises a plurality of cameras pointed at a rear of the vehicle and wherein the method comprises: generating a combined image for each camera; associating dimensions of the vehicle and any objected connected thereto with each combined image; determining whether the associated dimensions are inconsistent.

19. The vehicle of claim 1, further comprising at least one sensor, wherein the processor(s) are further configured to, responsive to detecting, via the at least one sensor, that the vehicle is in motion, record the plurality of images via the camera.

20. The vehicle of claim 1, further comprising at least one sensor, wherein the processor(s) are further configured to: responsive to detecting, via the at least one sensor, that the vehicle attains a predetermined speed, record the plurality of images via the camera.

21. The vehicle of claim 1, wherein the processor(s) is further configured to capture a predetermined number of images until a portion of the combined image reaches a predetermined value.

22. The vehicle of claim 1, wherein the processor(s) is further configured to modify the determined dimensions by applying a multiplier.

23. A vehicle comprising:
a camera; and
processor(s) configured to:
record images via the camera;
combine the recorded images to generate a combined image;
identify edges in the combined image;
update dimensions of the vehicle and nay objected connected thereto based on the identified edges; and
identify outermost edges in the combined image; and
update the dimensions based on the identified outermost edges only if the identified outermost edges are located within a predetermined pixel area of the combined image, the predetermined pixel area including only a portion of the pixels of the combined image.

24. A method of finding dimensions, via processor(s) of a vehicle comprising a camera, the method comprising:
  recording images via the camera;
  combining the recorded images to generate a combined image;
  identifying edges in the combined image;
  updating dimensions of the vehicle and any objects connected thereto based on the identified edges;
  identifying outermost edges in the combined image; and
  updating the dimensions based on the identified outermost edges only if the identified outermost edges are located within a predetermined pixel area of the combined image, the predetermined pixel area including only a portion of the pixels of the combined image.

* * * * *